(12) United States Patent
Hammond

(10) Patent No.: US 10,895,173 B2
(45) Date of Patent: Jan. 19, 2021

(54) POWER GENERATION

(71) Applicant: CCm Technologies Limited, Begbroke (GB)

(72) Inventor: Peter Hammond, Hailey (GB)

(73) Assignee: CCm Technologies Limited, Begbroke (GB)

( * ) Notice: Subject to any disclaimer, the term of this patent is extended or adjusted under 35 U.S.C. 154(b) by 0 days.

(21) Appl. No.: 16/465,090

(22) PCT Filed: Nov. 22, 2017

(86) PCT No.: PCT/GB2017/053512
§ 371 (c)(1),
(2) Date: May 29, 2019

(87) PCT Pub. No.: WO2018/100339
PCT Pub. Date: Jun. 7, 2018

(65) Prior Publication Data
US 2019/0323385 A1   Oct. 24, 2019

(30) Foreign Application Priority Data

Dec. 1, 2016 (GB) .................................. 1620446.3
Apr. 7, 2017 (GB) .................................. 1705618.5

(51) Int. Cl.
*F02C 1/10* (2006.01)
*F01K 25/10* (2006.01)
*F02C 1/02* (2006.01)

(52) U.S. Cl.
CPC .............. *F01K 25/103* (2013.01); *F02C 1/02* (2013.01); *F02C 1/10* (2013.01)

(58) Field of Classification Search
CPC ......... F01K 25/08; F01K 25/10; F01K 25/103
USPC .................... 60/645, 647, 651, 671
See application file for complete search history.

(56) References Cited

U.S. PATENT DOCUMENTS

2014/0174086 A1*   6/2014   Kare .................... H02K 7/1823
                                                                  60/670

FOREIGN PATENT DOCUMENTS

| DE | 3602896 | 8/1987 |
|---|---|---|
| DE | 10126403 | 12/2001 |
| EP | 0277777 | 8/1988 |
| EP | 2660433 | 11/2013 |
| JP | 2003-126681 | 5/2003 |
| JP | 2004-239250 | 8/2004 |
| WO | WO-2016/144197 | 9/2016 |

OTHER PUBLICATIONS

Machine Translation of DE 3602896 A1 to Haeberle, published 1987.*

(Continued)

*Primary Examiner* — Mark A Laurenzi
*Assistant Examiner* — Mickey H France
(74) *Attorney, Agent, or Firm* — Howson and Howson LLP

(57) ABSTRACT

A method of driving a turbine, the method comprising:
(a) providing solid carbon dioxide;
(b) heating the solid carbon dioxide to produce a high pressure carbon dioxide fluid;
(c) passing the carbon dioxide over a blade of the turbine; and
(d) collecting the carbon dioxide that has passed over the turbine blade;
 wherein carbon dioxide collected in step (d) is in solid form.

10 Claims, 1 Drawing Sheet

(56) References Cited

OTHER PUBLICATIONS

Figure 1:
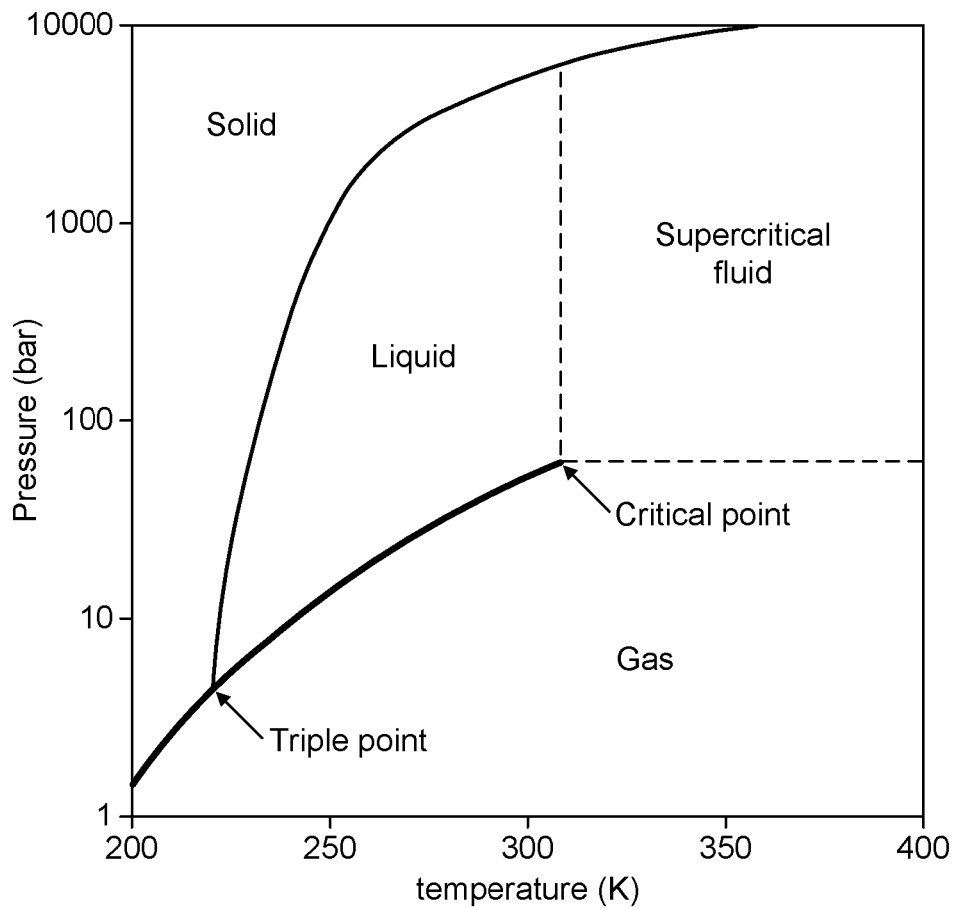

International Search Report and Written Opinion issued on International Patent Application PCT/GB2017/053512, dated Mar. 28, 2018.
Combined Search and Exam Report issued on UK Patent Application No. GB1719412.7, dated May 17, 2018 with Search Report, dated Apr. 24, 2017.
Search issued on UK Patent Application No. GB16204463.3, dated Apr. 25, 2017.

* cited by examiner

POWER GENERATION

CROSS-REFERENCE TO RELATED APPLICATIONS

This is a National Stage Entry under 35 U.S.C. 371 of International Patent Application No. PCT/GB2017/053512, filed Nov. 22, 2018, which claims priority to UK Patent Application No. 1620446.3, filed Dec. 1, 2016, and UK Patent Application No. 1705618.5, filed Apr. 7, 2017. These applications are incorporated by reference herein.

The present invention relates to a method of power generation. In particular the invention relates to a method of power generation using carbon dioxide.

The present invention relates to the generation of electrical power. Almost all electrical power in the world is generated using a turbine driven by a fluid which drives a generator. The turbine may be driven by wind, water, steam or by burning natural gas. Most commonly steam is used to drive the turbine. The steam may be generated by heating water by the combustion of fossil fuels, by nuclear fusion or by using a renewable source, for example using heat from solar sources.

The present invention uses carbon dioxide as an alternative means of driving a turbine, which offers a number of advantages as will be further described herein.

According to a first aspect of the present invention there is provided a method of driving a turbine, the method comprising:
(a) providing solid carbon dioxide;
(b) heating the solid carbon dioxide to produce a high pressure carbon dioxide fluid;
(c) passing the carbon dioxide over a blade of the turbine; and
(d) collecting the carbon dioxide that has passed over the turbine blade;
wherein carbon dioxide collected in step (d) is in solid form.

According to a second aspect of the present invention there is provided an apparatus for driving a turbine, the apparatus comprising a first vessel closable by a valve and a second vessel wherein the two vessels are connected by a conduit and wherein a blade of a turbine is located within the conduit such that gas flowing through the conduit causes the turbine to rotate; wherein the temperature in the first vessel is adjustable.

According to a third aspect of the present invention there is provided a method of generating power, the method comprising:
(i) providing an apparatus of the second aspect;
(ii) adding solid carbon dioxide to the first vessel;
(iii) supplying heat to the first vessel whilst closed; and
(iv) opening the valve to allow carbon dioxide to pass through the conduit into the second vessel.

Preferred features of the first, second and third aspects of the invention will now be described. Any feature of any aspect may be combined with any feature of any other aspect as appropriate.

In order to understand the present invention it is important to understand the phases that may exist for carbon dioxide. FIG. 1 shows a phase diagram for carbon dioxide. At low pressure it always exists as a gas. At temperatures and pressures below the triple point (−56.6° C., 5.19 bar), carbon dioxide sublimes. At temperatures above the triple point, carbon dioxide turns first to a liquid as the pressure increases and then to a solid, until the critical point is reached (30.98° C., 73.77 bar). At temperatures and pressures above the critical point carbon dioxide exists as a supercritical fluid.

The property of carbon dioxide that is advantageously used in the present invention is the fact that it sublimes at atmospheric pressure. The sublimation point at atmospheric pressure is −78.5° C. It is relatively simple to store and transport materials at this temperature and thus carbon dioxide can be transported in solid form without the need for a pressurised container. A solid material is easy to handle.

In step (a) of the method of the present invention solid carbon dioxide is provided. This is suitably provided within a vessel closable by a valve, suitably the first vessel of the apparatus of the second aspect.

Suitably solid carbon dioxide is provided in step (a) at atmospheric pressure. It is simple to deliver a solid material to a vessel at atmospheric pressure. Thus prior to delivery to the vessel (suitably the first vessel of the second aspect), the carbon dioxide is suitably maintained at a temperature of −78.5° C. or below. The vessel to which the carbon dioxide is delivered need not be temperature controlled at that point.

Once the carbon dioxide has been delivered to the vessel, the vessel is suitably closed, and the valve is also closed. At this point the temperature of the vessel is suitably increased. This is suitably achieved by delivering heat to the vessel. In preferred embodiments the apparatus of the second aspect further comprises means for delivering heat to the first vessel.

Step (b) of the method of the first aspect of the invention involves heating the carbon dioxide to produce a high pressure carbon dioxide fluid.

By a high pressure carbon dioxide fluid we mean to refer to a carbon dioxide in a fluid form at a pressure greater than atmospheric pressure. Preferably the pressure is at least 2 bar, suitably at least 5 bar, more preferably at least 10 bar, suitably at least 20 bar, preferably at least 50 bar, for example at least 70 bar, suitably at least 90 bar, for example at least 100 bar. In step (b) the carbon dioxide may be heated to provide a pressure of up to 150 bar, preferably up to 200 bar, for example up to 250 bar or up 300 bar.

When heating the carbon dioxide in step (b) an increase in temperature is also suitably achieved. Suitably the temperature is at least −60° C., preferably at least −55° C., suitably at least −50° C. The temperature may be greater for example above −30° C. or above −15° C. or above 0° C. The temperature may reach as high as 20° C. or even as high as 50° C.

The temperature and pressure will change depend on the extent of heating. The high pressure carbon dioxide fluid provided in step (b) may be a high pressure gas, it may be a liquid, or it may be a supercritical fluid.

In some preferred embodiments step (b) involves heating solid carbon dioxide to produce supercritical carbon dioxide.

Because the vessel is closed, as heat is delivered the pressure and the temperature of the carbon dioxide contained therein increases. Initially the carbon dioxide will sublime and as the gas is heated further and the pressure rises, a liquid or supercritical fluid will be formed.

Heating of the solid carbon dioxide in step (b) may be achieved by any suitable means. Such means will be known to the person skilled in the art. In preferred embodiments heating is achieved by passing a heating element through the vessel, for example an electrical heating element or a pipe carrying water or a thermal fluid.

Step (c) of the method of the first aspect involves passing the carbon dioxide over a blade of a turbine.

Suitably the method of the first aspect is carried out in an apparatus of the second aspect. Suitably step (c) involves opening the valve of the vessel containing the carbon dioxide, suitably the first vessel of the second aspect. The pressure in the conduit and the second vessel is suitably much lower than the pressure in the first vessel prior to opening the valve. Suitably the second vessel is open to the conduit when the valve of the first vessel is opened. Suitably the pressure in the conduit and the second vessel when the valve to the first vessel is opened is less than 5 bar, preferably less than 3 bar, suitably less than 2 bar. Suitably the pressure in the conduit and the second vessel when the valve to the first vessel is opened is around normal atmospheric pressure, i.e. about 1.01 bar.

Suitably the temperature in the second vessel when the valve to the first vessel is opened is less than 50° C. Suitably it is the local ambient temperature.

The turbine blade is located in the conduit. The conduit may therefore be considered as being divided into two portions by the turbine blade.

The portion of conduit which is adjacent to the second vessel may be cooled.

The portion of the conduit which is adjacent to the first vessel may be heated.

In some embodiments the second vessel may be cooled.

Step (d) of the method of the first aspect involves (d) collecting the carbon dioxide that has passed over the turbine blade.

Suitably due to the pressure differential, when the valve to the first vessel is opened high pressure carbon dioxide fluid flows through the conduit over the turbine blade and towards the second vessel. As the carbon dioxide flows over the turbine blade it expands and cools significantly. This expansion and cooling causes the carbon dioxide to solidify. The solid material is then collected in the second vessel.

In some embodiments the region of the apparatus between the valve the turbine may be heated. This is to ensure that expansion continues once the fluid has left the vessel. The valve and/or the portion of the conduit between the valve and the turbine may be heated.

This heating may be necessary to ensure that the carbon dioxide does not solidify before it passes over the turbine blade.

In some embodiments the portion of the conduit between the first vessel and the turbine blade may include a baffle to encourage flow towards the blade. In some embodiments the baffle may be heated.

Thus in preferred embodiments step (d) of the method of the first aspect involves collecting solid carbon dioxide in the second vessel of the apparatus of the second aspect.

Advantageously because the carbon dioxide that has passed over the turbine blade solidifies the pressure in the conduit and the second vessel does not increase and so the high pressure carbon dioxide fluid continues to flow out of the first vessels and through the conduit until the supply is substantially exhausted.

Solidification of the carbon dioxide in the second vessel causes a significant reduction (approximately $10^3$) in the volume occupied by the carbon dioxide. This leads to a drop in pressure across the turbine blade which further drives flow across the blade. In some embodiments the portion of the conduit between the turbine blade and the second vessel may be cooled. However this is frequently not necessary as solidification of the carbon dioxide causes sufficient cooling.

Preferred features of the method of generating power according to the third aspect are as previously defined. Allowing carbon dioxide to pass over the turbine blade suitably causes the turbine to rotate and this may be used, for example, to generate electrical power. The generation of electrical power from a rotating turbine may be achieved by any known means.

Suitably the apparatus is configured to ensure that when the carbon dioxide is passed over a blade of a turbine, the turbine rotates. This rotation can then be used to generate electrical power.

Suitably the apparatus is configured to enable the carbon dioxide gas to pass sequentially over multiple blades of a turbine. This will facilitate continuous rotation as the gas flows. Suitable positioning of turbine blades within a gas flow is within the competence of the person skilled in the art. The arrangement may be the same as arrangements commonly used for steam powered turbines.

The present invention may suitably involve a closed system. In preferred embodiments carbon dioxide is not deliberately allowed to escape from the apparatus during the method. Thus the turbine blades are preferably located entirely within the conduit. It is inevitable that there will be some inefficiency in the system and that some carbon dioxide is lost. However it is preferably not allowed to escape intentionally.

Solid carbon dioxide is suitably collected in the second vessel during the method. Once the supply of supercritical carbon dioxide from the first vessel has been exhausted and all of the solid carbon dioxide has been collected in the second vessel the second vessel can be closed.

The second vessel is connected to the conduit. Thus there is an opening in the second vessel which is connected to the conduit. In some preferred embodiments this opening may be closable. Suitably the second vessel is closable by a valve. Suitably the valve provided on the second vessel is of the same type as the valve that closes the first vessel.

In preferred embodiments the first vessel and the second vessel are substantially the same.

Suitably the first and second vessels are each provided with a valve. Each valve may open completely to allow solid material to pass into the vessel from the conduit. Each valve may also be closed to prevent fluid material escaping from the vessel and to withstand a build up of pressure within the vessel. Each valve may open to allow high pressure fluid to escape from the vessel into the conduit.

Thus in preferred embodiments the apparatus of the second aspect of the present invention comprises a first vessel closable by a valve and a second vessel closable by a valve wherein the two vessels are connected by a conduit. Suitably each valve is a two way valve which allows material to flow into and out of the vessel. Each valve may have a first open position which allows solid material to be deposited into the vessel and a second open position which allows high pressure fluid to escape from the vessel. The first open position and the second open position for each valve may be the same or different.

Thus in preferred embodiments the invention may involve providing solid carbon dioxide in a first closed vessel; heating the solid carbon dioxide to produce a high pressure carbon dioxide fluid; and opening a valve of the first vessel to allow the high pressure carbon dioxide to pass through the conduit such that it passes through an open valve into the second vessel. On passing through the conduit it passes over the blade of a turbine and causes the turbine to rotate. Once the supply of high pressure fluid from the first vessel is exhausted and all of the carbon dioxide solid has been collected in the second vessel, the valve on the second vessel is suitably closed. The carbon dioxide in the second vessel can then be heated to provide a high pressure fluid, the valve on the second vessel can then be opened and the fluid allowed back into the conduit to pass the other way over the turbine blades and back into the first open vessel as solid. Thus the process can be run in reverse.

Suitably the turbine is able to rotate in either direction.

The apparatus of the present invention suitably includes a temperature and pressure gauge in at least the first vessel and preferably additionally in the second vessel. Thus a user can determine when the valve should be opened once a particular pressure and/or temperature is reached. Such a process may be automated.

In preferred embodiments in which the process can be run in reverse each portion of the conduit may be provided with means for heating and means for cooling.

In some embodiments an element comprising a heat transfer fluid may be positioned within or around each portion of the conduit. Such a fluid can be optionally heated or cooled as desired.

An advantage of using the (preferably closed) system of the present invention is that it is highly efficient. At each stage heat must be supplied into the system. However an advantage of using carbon dioxide rather than steam to drive the turbine is that a lower amount of heat energy needs to be supplied to achieve an equivalent power output.

Because carbon dioxide can be supplied in solid form less energy is needed to produce fluid of the pressure needed to drive the turbine. Thus the heat energy that must be supplied to the carbon dioxide in the method of the present invention is lower than would typically need to be supplied to water to drive the turbine using steam.

Additionally because carbon dioxide has a higher molecular weight than water it can apply a greater force to the turbine blade for a given velocity of gas.

A particular advantage of the present invention is that it allows "low quality" heat, for example waste heat from another source of power generation, to be effectively utilised. Such heat is usually insufficient to generate the steam necessary to drive a turbine.

The carbon dioxide used in the present invention could also be captured from, for example, from the combustion of fossil fuels. Thus it would be highly advantageous to locate a power generation apparatus of the present invention on an existing power generation site.

Figure 2:
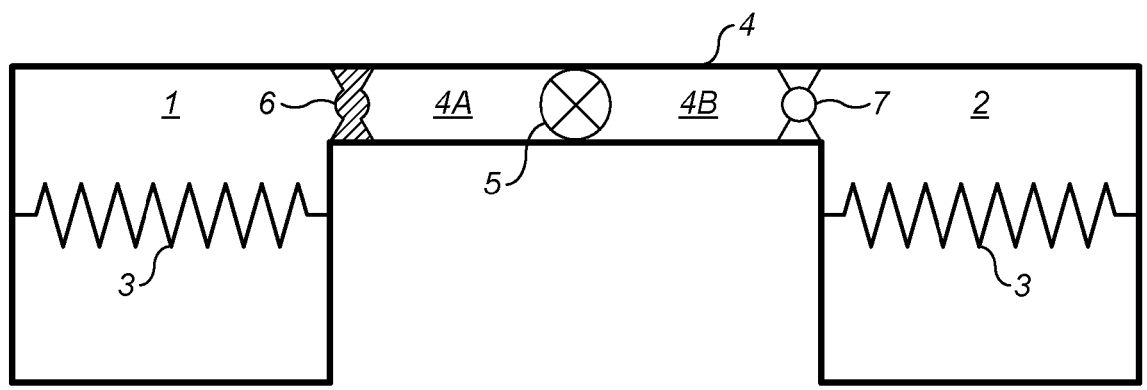

The invention will now be further described with reference to the accompanying figures in which FIG. 1 shows the phase diagram of carbon dioxide and FIG. 2 provides a schematic view of the apparatus of the present invention.

The apparatus of FIG. 2 includes a first vessel 1 and a second vessel 2 each of which have a heating element 3 running through them. Vessels 1 and 2 are joined by a conduit 4 and a turbine 5 is located within the conduit. The conduit is split into two portions 4A and 4B by the turbine. Each of portions 4A and 4B of the conduit may be independently heated or cooled. Each vessel is closed by a valve (6, 7). The valve 6 to vessel 1 is initially closed and valve 7 to vessel 2 is initially open. Solid carbon dioxide (dry ice) is loaded into vessel 1 which is closed by valve 6. The carbon dioxide begins to expand and the heating element is activated to increase the temperature in vessel 1, causing the pressure to also increase rapidly. When a desired pressure and temperature are reached, valve 1 is opened. Carbon dioxide fluid flows through the conduit and the turbine and into vessel 2 through open valve 1. When valve 1 is opened there is a pressure drop as the fluid passes through the conduit from portion 4A into portion 4B and over the turbine. This leads to rapid expansion, cooling and solidification of the carbon dioxide. The resultant solid material is collected in vessel 2. Once all of the solid carbon dioxide has been collected, valve 7 may be closed and the process repeated in reverse.

The invention claimed is:

1. A method of driving a turbine, the method comprising:
   (a) providing solid carbon dioxide;
   (b) heating the solid carbon dioxide to produce a high-pressure carbon dioxide fluid;
   (c) passing the carbon dioxide over a blade of the turbine; and
   (d) collecting the carbon dioxide that has passed over the turbine blade;
   wherein the carbon dioxide collected in step (d) is in solid form; wherein the method is carried out in an apparatus comprising a first vessel closable by a first valve and a second vessel closable by a second valve, wherein the two vessels are connected by a conduit; wherein the blade of the turbine is located within the conduit such that gas flowing through the conduit causes the turbine to rotate; wherein the temperature in the first vessel is adjustable; wherein each valve has a first open position which allows solid material to be deposited into the vessel and a second open position which allows high pressure fluid to escape from the vessel; wherein the first open position and the second open position for each valve may be the same or different;
   thereby driving the turbine.

2. A method according to claim 1 wherein the fluid produced in step (b) has a pressure of at least 20 bar.

3. A method of driving a turbine according to claim 1, the method further comprising:
   (e) closing the second valve on the second vessel;
   (f) heating the carbon dioxide in said second vessel to produce a high-pressure carbon dioxide fluid; and
   (g) opening said second valve to allow the carbon dioxide fluid in step (f) to pass through the conduit into the first vessel.

4. An apparatus for driving a turbine, the apparatus comprising a first vessel closable by a first valve and a second vessel closable by a second valve wherein the two vessels are connected by a conduit and wherein a blade of a turbine is located within the conduit such that gas flowing through the conduit causes the turbine to rotate; wherein the temperature in the first vessel is adjustable; wherein each valve has a first open position which allows solid material to be deposited into the vessel and a second open position which allows high pressure fluid to escape from the vessel; and wherein the first open position and the second open position for each valve may be the same or different.

5. An apparatus according to claim 4 which further comprises means for delivering heat to the first vessel.

6. An apparatus according to claim 4 wherein the turbine blades are located entirely within the conduit.

7. An apparatus according to claim 5 wherein the turbine blades are located entirely within the conduit.

8. A method of generating power, the method comprising:
   (i) providing an apparatus for driving a turbine,
   wherein the apparatus comprises a first vessel closable by a first valve and a second vessel closable by a second valve; wherein the two vessels are connected by a conduit and wherein a blade of a turbine is located within the conduit such that gas flowing through the conduit causes the turbine to rotate; wherein the temperature in the first vessel is adjustable; wherein each valve has a first open position which allows solid material to be deposited into the vessel and a second open position which allows high-pressure fluid to escape from the vessel; and wherein the first open position and the second open position for each valve may be the same or different;

(ii) adding solid carbon dioxide to the first vessel;
(iii) supplying heat to the first vessel while the valve of said first vessel is closed; and
(iv) opening said first valve to allow carbon dioxide to pass through the conduit into the second vessel;
thereby generating power.

9. A method according to claim 8 wherein the conduit is heated.

10. A method of generating power according to claim 8, the method further comprising:
(v) closing the second valve on the second vessel;
(vi) heating the carbon dioxide in said second vessel to produce a high-pressure carbon dioxide fluid; and
(vii) opening said second valve to allow the carbon dioxide fluid in step (vi) to pass through the conduit into the first vessel.

* * * * *